June 2, 1970  F. L. HILL ET AL  3,515,290
BALE TRANSFER MECHANISM
Filed May 13, 1968  5 Sheets-Sheet 1

INVENTORS
FREDRICK L. HILL
LOYD CURTIS SINDEL

Webster & Webster
ATTORNEYS

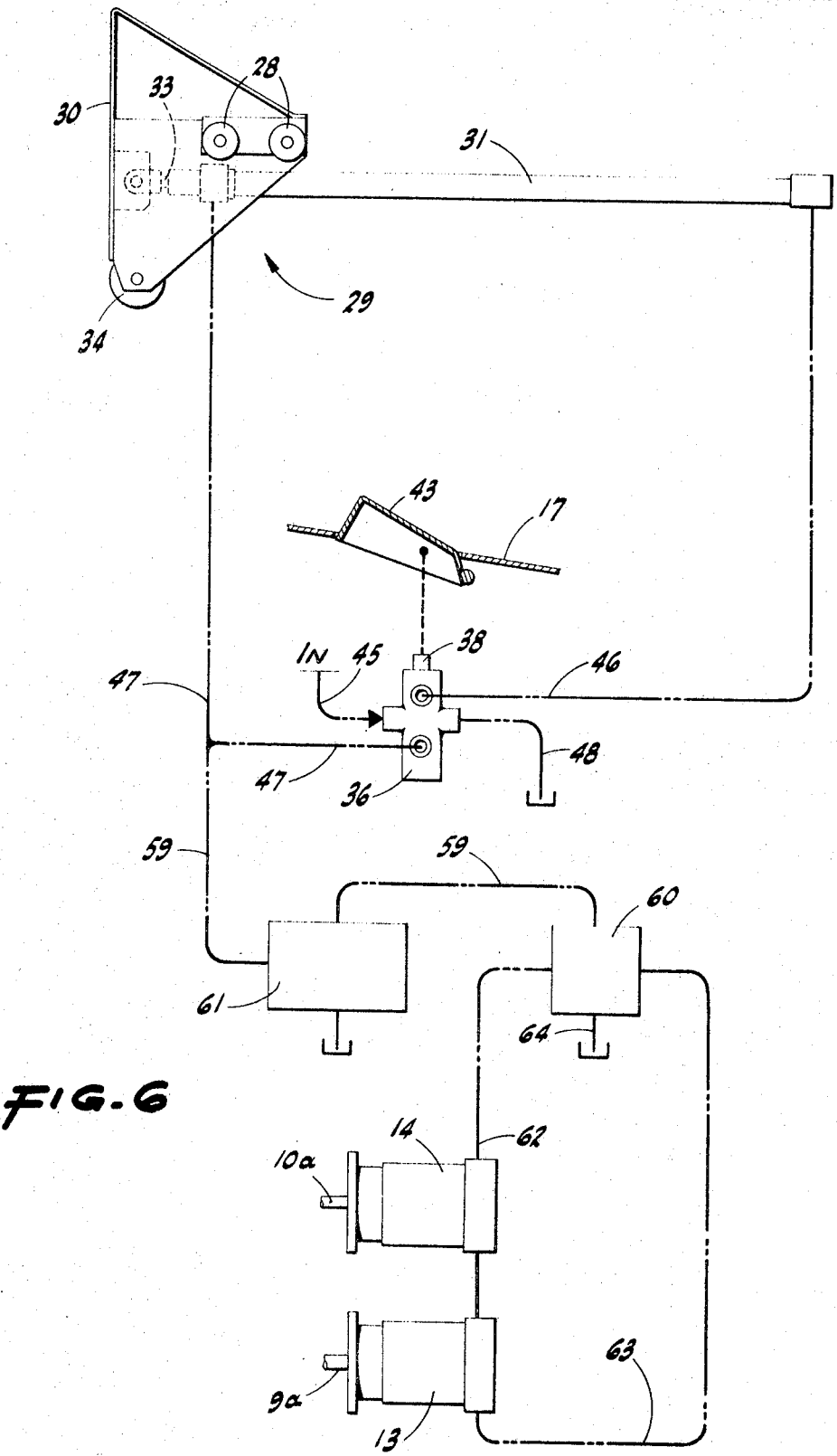

United States Patent Office 3,515,290
Patented June 2, 1970

3,515,290
BALE TRANSFER MECHANISM
Fredrick L. Hill, Rio Vista, and Loyd Curtis Sindel, Lafayette, Calif., assignors to Blackwelder Manufacturing Company, Rio Vista, Calif., a corporation of California
Filed May 13, 1968, Ser. No. 728,522
Int. Cl. B65g 57/32
U.S. Cl. 214—6                             2 Claims

ABSTRACT OF THE DISCLOSURE

A mobile, agricultural machine for picking up hay bales from the field and forming such bales into a stack for later deposit on the ground; the machine including a bale pick-up elevator which delivers the bales individually to a bale-receiving platform from which said individual bales are then moved—by a bale transfer mechanism—into row array on a bale support disposed above an initially raised, but step-by-step lowerable bed and onto which the rows of bales are delivered from said bale support whereby to form on said bed a stack comprised of layered bales.

BACKGROUND OF THE INVENTION

In a mobile, hay bale stack-forming machine of the type shown in pending U.S. patent application Ser. No. 569,503, filed Aug. 1, 1966, now Pat. No. 3,400,839 in the name of George Jay and Everett V. Rankins, there is included a bale transfer mechanism which serves to move individual bales from a bale-receiving platform (fed from a bale pick-up elevator) onto a bale support in row aray, and from which support the rows were discharged successively onto an initially raised, but step-by-step lowerable bed whereby to form layers and, consequently, a stack of such bales on the bed. In the machine shown in such pending application, however, the bale transfer mechanism was relatively complex and hence presented certain problems not only with respect to manufacture and maintenance, but also efficiency of operation. The present invention was conceived in the light of such problems.

SUMMARY OF THE INVENTION

The present invention provides, as a major object, an improved bale transfer mechanism for a hay bale stack-forming machine of the type described; such mechanism, with a relatively simple structure and efficient function, serving the purpose of successively transferring individual bales from the bale-receiving platform (fed by a bale pick-up elevator) to the bale support and onto which the bales are received in row array for subsequent discharge from such bale support and deposit on the bed therebelow to form a stack of layered bales on said bed.

The present invention provides, as an additional object, a bale transfer mechanism—as above—which acts in automatic response to an individual bale being delivered onto the bale-receiving platform by the bale pick-up elevator; such bale transfer mechanism including a power cylinder and a novel fluid pressure conduit system in which the power cylinder is interposed in controlled relation.

The present invention provides, as another object, a bale transfer mechanism, as in the preceding paragraph, wherein such fluid pressure conduit system includes a control valve; there being a novel valve-actuating trigger unit responsive to deposit of a bale on the bale-receiving platform.

The present invention provides, as still another object, a bale transfer mechanism, as in the preceding paragraph, in which the trigger unit is re-set automatically upon completion of actuation of the bale transfer mechanism to deliver a bale from the bale-receiving platform to the bale support.

The present invention provides, as still another object, a bale transfer mechanism, as in the preceding paragraphs, which includes a spring-urged latch unit which maintains the valve of the fluid pressure conduit system in either the position to which the valve is moved by operation of the trigger unit, or in the position occupied by said valve when such trigger unit is re-set.

The present invention provides, as still another object and in combination with the bale transfer mechanism, a bale pick-up elevator embodying a fluid pressure motor drive which is included in the valve-controlled fluid pressure conduit system in which the power cylinder of the bale transfer mechanism is interposed; the arrangement being such that the drive of the bale pick-up elevator is automatically discontinued during actuation of said bale transfer mechanism.

The present invention provides, as a further object, a bale transfer mechanism which is designed for ease and economy of manufacture.

The present invention provides, as a still further object, a practical, reliable, and durable bale transfer mechanism and one which is exceedingly effective for the purpose for which it is designed.

BRIEF DESCRIPTION OF THE DRAWINGS

FIG. 5 is a fragmentary elevation on substantially line 5—5 of FIG. 4; the view showing the details of the latch unit.

FIG. 6 is a diagram of the valve-controlled fluid pressure conduit system.

DESCRIPTION OF THE PREFERRED EMBODIMENT

Figure 1:
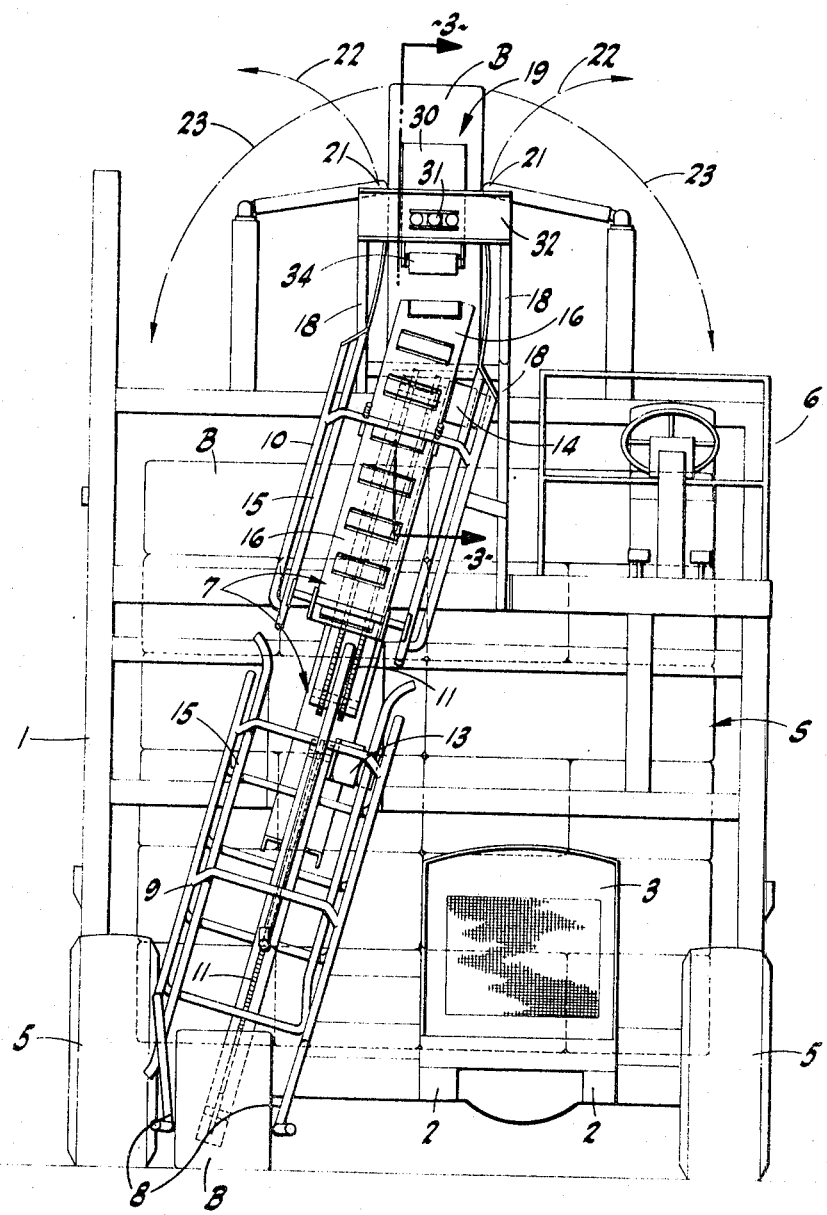
FIG. 1 is a front elevation, mainly diagrammatic, of the hay bale stack-forming machine in which the improved bale transfer mechanism is included.
Figure 2:
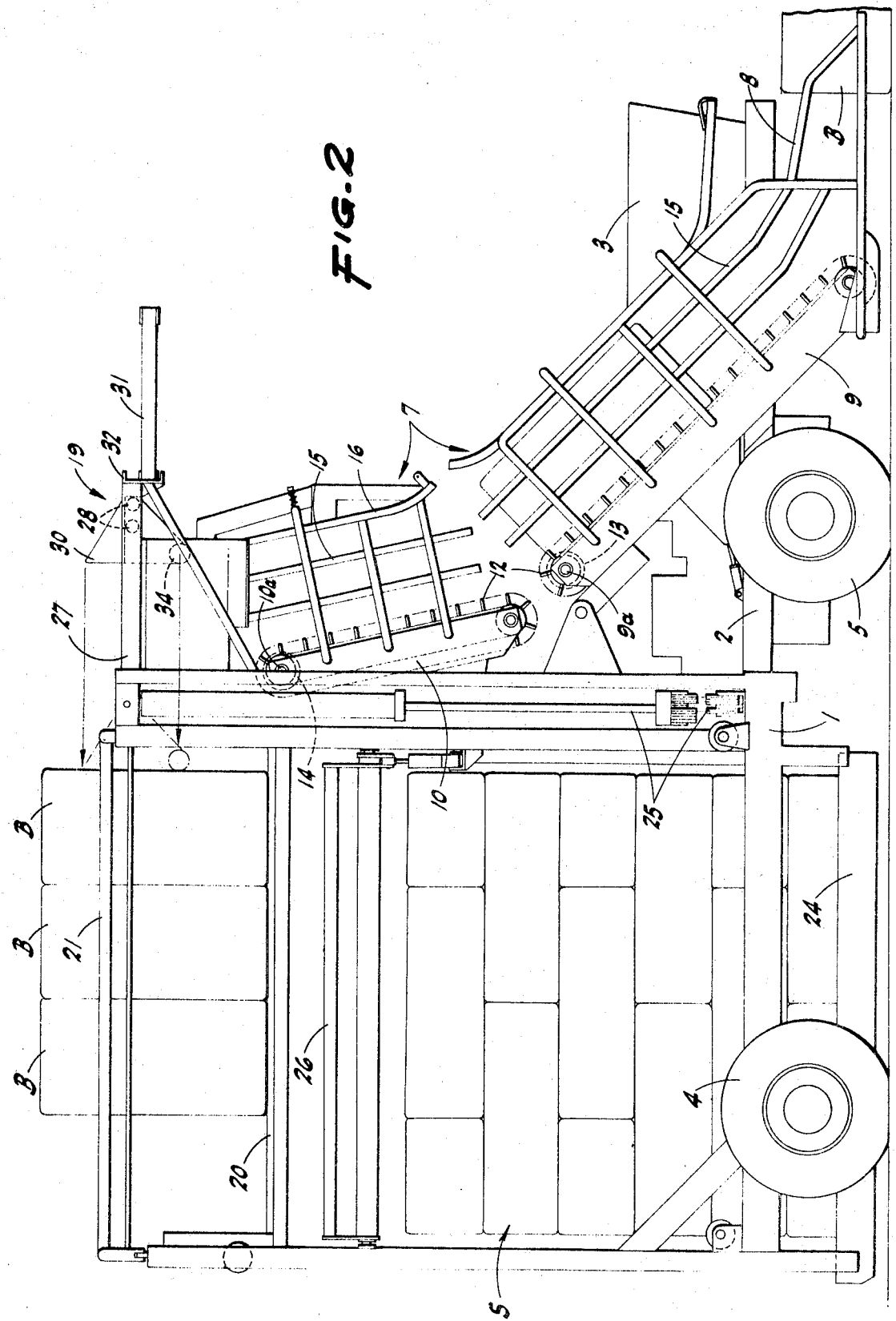
FIG. 2 is a side elevation, again mainly diagrammatic, of such machine.

Referring now more particularly to the drawings and to the characters of reference marked thereon, the hay bale stack-forming machine comprises a heavy-duty, upstanding main frame 1 of generally rectangular form but having a forward projection 2 which is of reduced width and laterally offset from the central longitudinal plane of said main frame; the frame projection 2 providing the mount for an engine 3 and other driven instrumentalities of the machine. The frame is supported by rear wheels 4 and front wheels 5; the latter being power stearable and driven from the engine 3. The machine is operated and controlled from a driver's station 6 mounted in an elevated, laterally offset position on the front of the main frame 1 some distance above the engine.

A bale pick-up elevator, indicated generally at 7, is disposed with its lower or pick-up end close to the ground alongside the frame projection 2; such lower end of the elevator being in the form of a throat 8 to properly guide a bale B—resting on the ground—to the elevator for pick-up thereby as the machine advances. From the throat 8, the bale pick-up elevator 7 extends at an upward and rearward incline, as well as with a lateral slant, to an upper end termination at the front and adjacent the top of the upstanding main frame 1 at substantially the center of the width thereof.

As shown, the bale pick-up elevator 7 is comprised of a lower elevator section 9 and an upper elevator section 10; the latter being inclined more sharply than section 9. The elevator sections 9 and 10 include, in the bottom thereof, endless longitudinal chains 11 driven in a direction such that the upper runs of the chains travel upwardly; such chains being provided with spaced prongs 12 which extend generally upwardly when moving in said upper runs.

The endless chains 11 of the elevator sections 9 and 10 are driven by hydraulic motors 13 and 14 coupled to the top cross shafts 9a and 10a, respectively, of such elevator sections.

Upon advance of the machine over a field on which bales of hay rest more or less in rows, the machine is steered so that the individual bales B enter the throat 8 and are then picked up by the elevator 7 and carried to the upper end thereof; each such bale—resting edgewise on the elevator—being impaled on certain of the prongs 12 and carried upward by the chains 11. In order to assure retention of the bales on the elevator 7, each of the sections 9 and 10 thereof includes a guideway 15; the guideway of the upper section 10 including a spring-pressed cover plate 16 fitted with rollers as shown.

At the upper end of the elevator 7 each bale B is discharged from the elevator and comes to rest—endwise—on a normally fixed, bale-receiving platform 17 adjustably secured to and spanning between a pair of transversely spaced posts 18 included in the main frame 1 centrally at the front thereof; such posts being spaced apart a distance substantially less than the width of such main frame.

The bale-receiving platform 17 is associated with a bale transfer mechanism, indicated generally at 19 and hereinafter described in detail, which is automatically operative—upon delivery of a bale onto said platform—to then move or transfer the bale from such platform onto a horizontal, longitudinally extending bale-support beam 20 rigidly mounted in the main frame 1 at the top and centrally of the width thereof.

The individual bales B are moved onto beam 20 until a row of bales rests thereon in initially non-tilting relation; the row being stabilized on the sides by longitudinal bars 21 adapted to be selectively power-swung, in a path 22, away from the rows of bales. After each row of bales is formed, the same is permitted, by swing-away of one or the other of the bars 21, to tilt off the beam 20 and gravitate therefrom, in a path 23, to one side or the other of such beam.

Each row of bales B, which gravitates from the beam 20, is received on a horizontal, vertically adjustable bed 24 suitably guided in the main frame 1 for step-by-step lowering from an initially raised position; such bed 24 being operated—on each side of the machine—by a power cylinder and cable assembly indicated in part at 25. Upon a layer of bales B being discharged onto the bed 24 (the driver, when necessary, stopping the machine and manually shifting the bales into proper position to provide an ultimately "keyed" stack) the bed is lowered and another layer of bales deposited on the previously formed layer; this being repeated until a full stack S of bales B is formed on such bed. Thereafter, and at a predetermined unloading point, the bed 24 is fully lowered and the stack S is pushed (by apparatus not here shown) off said bed and onto the ground.

In order to assure that each stack S is flush at the sides, and as is desirable for ease of unloading and later transport, the main frame 1 is provided on each side with longitudinal, laterally inwardly swingable "squaring" bars 26; the latter being suitably power actuated for engagement with the sides of each layer of bales.

The present invention resides essentially in the structure and operation of the bale transfer mechanism 19, and the cooperative relationship of the bale pick-up elevator 7; such bale transfer mechanism 19 comprising the following:

A pair of transversely spaced, channel-shaped guide beams 27 are secured to and project forwardly from the upper ends of the posts 18; such guide beams opening toward each other and receiving the rollers 28 of a longitudinally reciprocable carriage 29 which, at the rear, is fitted with a vertical, bale-pusher plate 30. The carriage 29 moves in a plane such that upon advance (or rearward movement) thereof from a normally retracted (or forwardly disposed position, the pusher plate will engage a bale B standing on the bale-receiving platform 17 and push such bale rearwardly onto the bale-suport beam 20.

The carriage 29 is operated by a double-acting, fluid pressure power cylinder 31 disposed longitudinally and mounted in connection with a cross beam 32 spanning between the front ends of the guide beams 27; the piston rod 33 of such cylinder being connected to the adjacent face of the pusher plate 30.

The carriage 29 includes a transverse roller 34 at the lower end; such roller serving—when the carriage is retracted—to assure of easy passage of each upwardly moving bale as it reaches the upper end of the elevator 7 and moves therefrom onto the bale-receiving platform 17.

Figure 3:
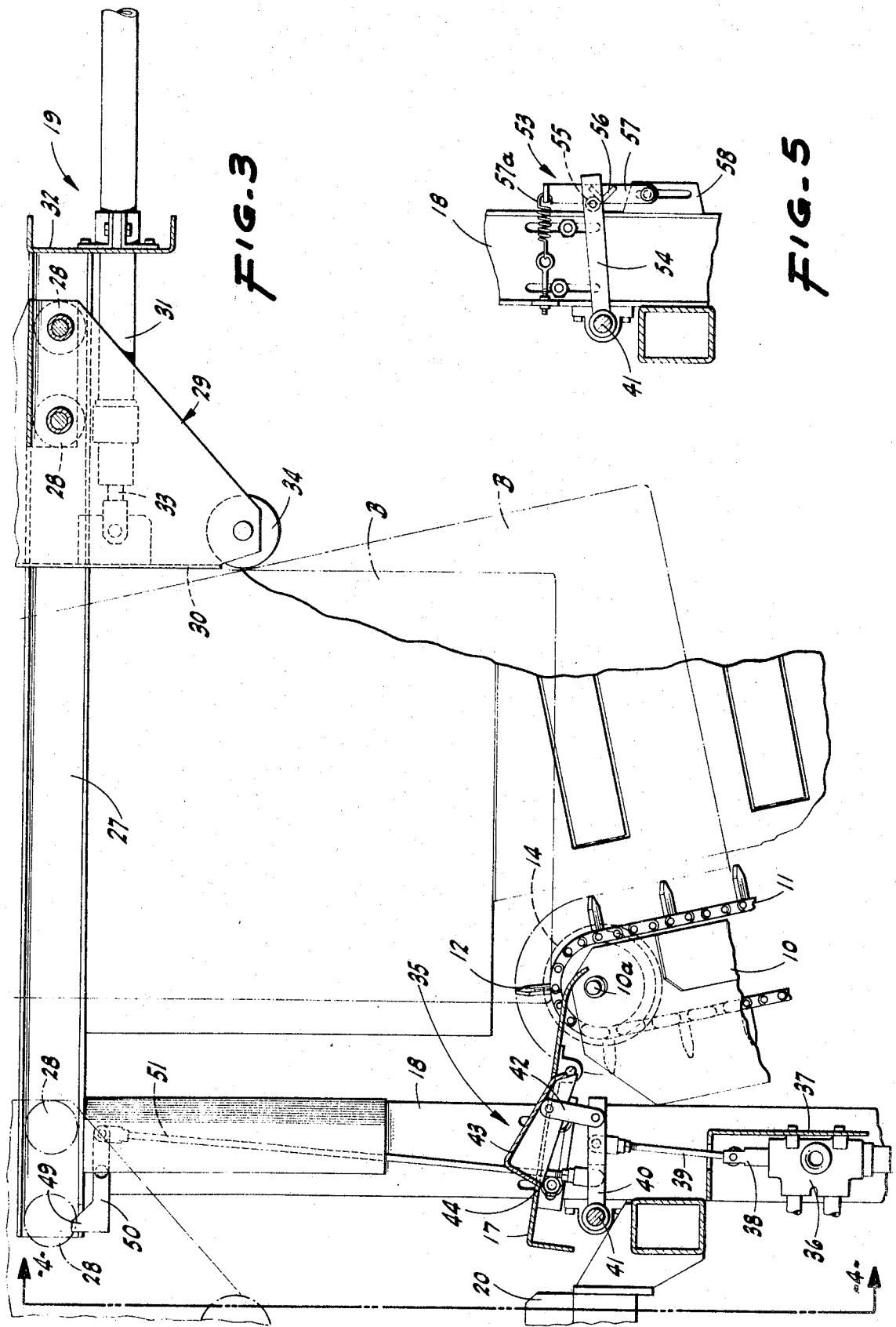
FIG. 3 is an enlarged, fragmentary, longitudinal sectional elevation on substantially line 3—3 of FIG. 1; the view showing the details of the bale transfer mechanism.
Figure 4:
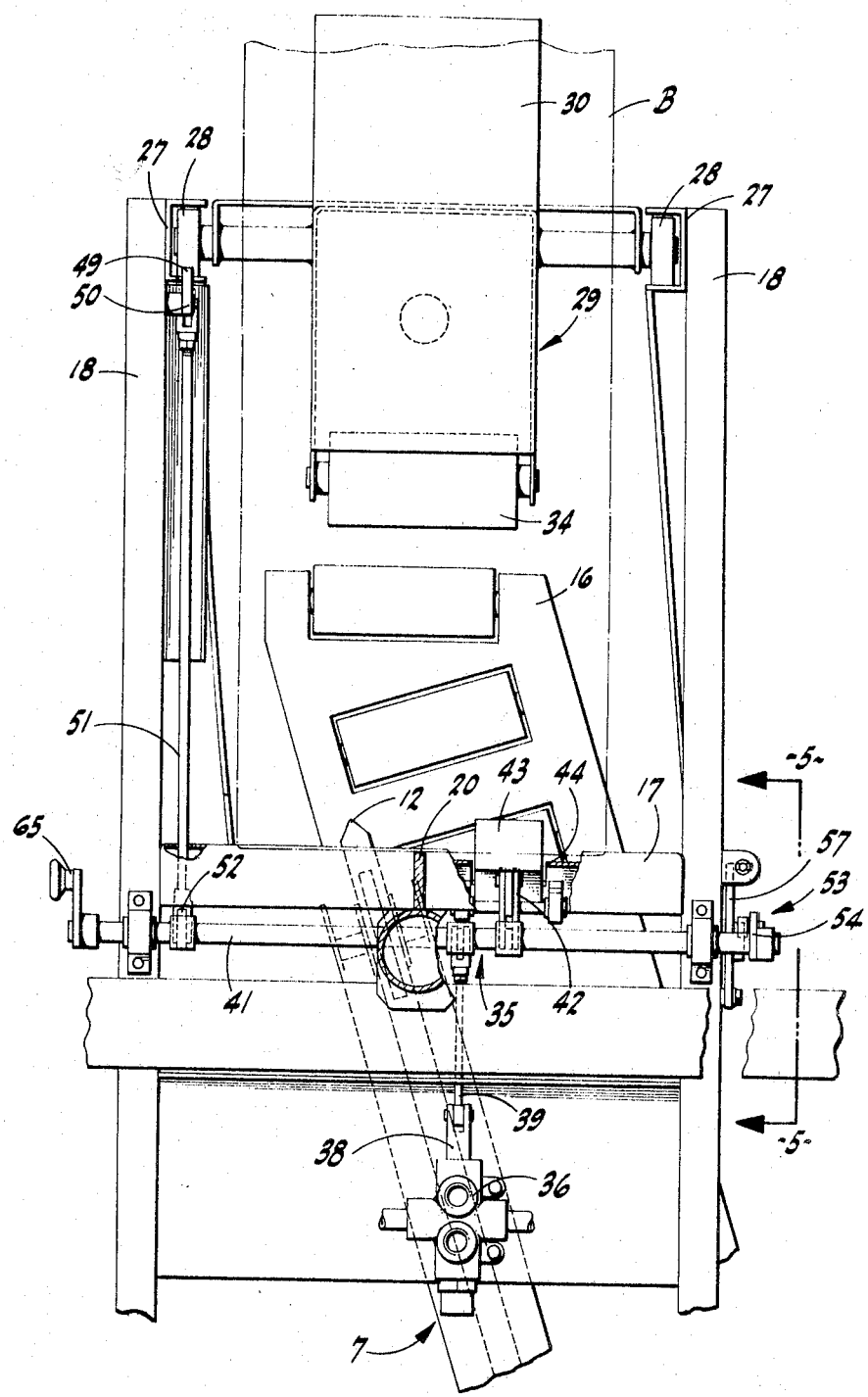
FIG. 4 is a transverse elevation, partly in section, on line 4—4 of FIG. 3.

The power cylinder 31 is actuated to extend the same and advance the carriage 29 to push a bale B from platform 17 onto beam 20, and to then return to retracted position, all—automatically—by means of a valve-controlled, fluid pressure conduit system responsive to a trigger unit; such conduit system being shown diagrammatically in FIG. 6, and the trigger unit being indicated generally at 35 in FIGS. 3 and 4.

The fluid pressure conduit system has a four-way valve 36 interposed therein; such valve being of sliding-spool type and is mounted on a cross member 37 beneath the bale-receiving platform 17. The valve spool 38 projects upwardly from the valve 36 and is attached by a pivotally connected link 39 to a forwardly projecting, radial arm 40 secured on a cross shaft 41 journaled on and spanning between the posts 18. In turn, the radial arm 40 is attached by a short, pivotally connected link 42 to the underside of a trigger 43 pivoted on the underside of the bale-receiving platform 17 and normally projecting—through an opening 44 in said platform—to a point thereabove. In other words, the trigger 43 normally lies mainly above platform 17 but is depressible by a bale B deposited on such platform.

Thus, as a bale B is deposited on platform 17 and the trigger is depressed, the link 42 swings radial arm 40 downward and the latter shifts link 39 and valve spool 38 likewise downward. This places the valve 36 in a position such that fluid pressure from a source 45 delivers through conduit 46 to the rear of power cylinder 31 whereby the same extends and piston rod 33 advances the carriage 29 and pushes the bale from platform 17 onto beam 20 as aforesaid. At the same time, fluid discharging from the front of the power cylinder 31 is fed by conduit 47 back to the valve 36 and from the latter to a return conduit 48 which leads to the reservoir of the source of fluid pressure supply (not shown).

When the carriage 29 reaches a position of full advance, one of the lead rollers 28 strikes an upstanding ear 49 (disposed in the path of such roller) of a double-ended swing lever 50 pivoted on the adjacent post 18. An elongated link 51 is pivotally connected to and extends between the end of lever 50, opposite ear 49, and a radial arm 52 fixed on cross shaft 41. As the roller 28 strikes and moves ear 49, the lever 50 is swing in a direction which pulls link 51 upward and which movement part-rotates cross shaft 41 in a direction to cause raising or resetting of the trigger 43 and return of valve spool 38 to its initial or raised position. In such raised position of the valve spool 38, the valve 36 has been returned to its normal or starting position and fluid pressure again flows through conduit 47 to the front of the power cylinder 31 and feeds from the rear of such power cylinder through conduit 46 to the valve 36 and thence to the return conduit 48. When the valve is so returned to its normal or starting position, the power cylinder contracts and the carriage 29 is retracted.

It is to be noted that—by reason of the described radial arm and link assembly—the lever 50 will be swung, to reset the ear 49 in a raised position, each time the trigger is depressed upon deposit of a bale B on platform 17.

In order to prevent "teetering" of the valve 36 in either of the positions occupied thereby, a yieldable or releasable latch unit, indicated generally at 53 (see FIG. 5), is provided; such latch unit comprising the following:

At one end the cross shaft 41 is provided with a fixed radial arm 54 fitted adjacent its outer end with a roller 55 which bears against one side or the other of a V-shaped latch member 56 on an upstanding swing arm 57 pivoted at its lower end on a bracket 58. The swing arm 57 is urged, by a spring 57a, in a direction to yieldably maintain the latch member 56 with one side or the other thereof in engagement with roller 55. The described latch unit 53 thus has a detent-like action and will firmly but yieldably hold the cross shaft 41 with the valve 36 in either position thereof. When the cross shaft 41 is part-rotated in one direction by depression of the trigger 43, or in the opposite direction by downward swinging movement of ear 49, the roller merely snaps by the latch member 56 as the arm 57 yields outward.

The bale pick-up elevator is normally in operation, except that it is stopped (to prevent possible jamming) each time a bale is deposited on the bale-receiving platform 17; this being accomplished as follows:

When the valve 36 is in its normal or starting position, fluid pressure exists in conduit 47 which fluid pressure holds power cylinder 31 contracted. Such fluid pressure also feeds through a branch conduit 59 which leads from conduit 47 to a direction-control valve 60. Also, a flow regulator 61 is interposed in conduit 59 intermediate its ends. From the direction-control valve 60, fluid pressure normally delivers, through a feed conduit 62, to the hydraulic motors 13 and 14 (which are series-connected as shown) causing the latter to operate simultaneously and, in turn, actuating the elevator 7 as the machine advances in the field. As the motors 13 and 14 operate, fluid discharges through a flow-back conduit 63 leading to the valve 60 and thence delivers back to the source through a return conduit 64.

However, then the valve 36 is reversed by deposit of a bale on platform 17, conduit 47 and conduit 59 are no longer under pressure feed and the motors 13 and 14, together with the elevator 7, cease to operate and remain so until the bale transfer mechanism 19 has functioned to move the bale from platform 17 onto beam 20. When this occurs, and the valve 36 is returned to its normal or starting position, fluid pressure again exists in conduits 47 and 59, and the hydraulic motors 13 and 14 and the elevator 7 restart and so continue until the next bale on the elevator is deposited on platform 17, whereupon the stop-start cycle is repeated.

While the operation of the bale transfer mechanism 19 is wholly automatic, the driver may at times desire to manually cause such operation to take place. To this end, the cross shaft 41 is provided—at the end adjacent and within reach of the driver's station 6—with a hand crank 65 by means of which said cross shaft can be part-rotated to change the position of the valve 36. Not only can the bale transfer mechanism 19 be thus caused to operate under manual control, but also the elevator 7 can be stopped and started when desired.

The described bale transfer mechanism 19, together with the cooperating bale pick-up elevator 7, provide for the rapid transfer of each bale from said elevator to the bale-support beam 20 in a positive and trouble-free manner, and under a normal condition of automatic control and operation.

From the foregoing description, it will be readily seen that there has been produced such a bale transfer mechanism as substantially fulfills the objects of the invention, as set forth herein.

While this specification sets forth in detail the present and preferred construction of the bale transfer mechanism, still in practice such deviations from such detail may be resorted to as do not form a departure from the spirit of the invention.

We claim:

1. In a hay bale stack-forming machine which includes a driven bale pick-up elevator, a bale-receiving platform onto which the elevator delivers bales one at a time, a bale support disposed to receive bales from the platform, and a bale transfer mechanism operative to move each bale from the platform onto the bale support; the bale transfer mechanism including a guided pusher, a fluid pressure power cylinder connected to the pusher to move the same between a retracted position and an advanced position, the pusher upon movement to advanced position engaging and moving a bale from the platform onto the bale support, the power cylinder being double acting, a fluid pressure conduit system connected to the power cylinder in reversing relation thereto, said conduit system including a control valve, the conduit system in one position or another position of the valve actuating the power cylinder in directions to advance or retract the pusher, respectively, a depressible trigger normally extending above the platform, the valve being disposed below the platform and including a member movable to place the valve in either of said positions thereof, linkage connected between the trigger and said valve member, the linkage being operative to move such valve member to place the valve in said one position in response to delivery of a bale onto the platform and resultant depression of the trigger, whereupon the power cylinder advances the pusher to move the bale from the platform onto the bale support, and means to then reset the trigger to its position extending above the platform, and to move said valve member so as to place the valve in said other position, whereupon the power cylinder retracts the pusher; the pusher including a guided carriage above the platform and to which carriage the power cylinder is connected, and said means including a movable element in the path of the carriage, such element being engaged and moved by the carriage upon substantially full advance of the pusher, and motion-transmitting instrumentalities connected between such element and said linkage; said movable element being a double-ended swing lever disposed above the platform and having an ear projecting from one end into the path of the carriage, and said instrumentalities including a turnable cross shaft below the platform, a radial arm on the cross shaft, an elongated link pivotally connected between the other end of the swing lever and said radial arm, and another radial arm on the cross shaft connected to the linkage between the trigger and valve member.

2. In a hay bale stack-forming machine which includes a driven bale pick-up elevator, a bale-receiving platform onto which the elevator delivers bales one at a time, a bale support disposed to receive bales from the platform, and a bale transfer mechanism operative to move each bale from the platform onto the bale support; the bale transfer mechanism including a guided pusher, a fluid pressure power cylinder connected to the pusher to move the same between a retracted position and an advanced position, the pusher upon movement to advanced position engaging and moving a bale from the platform onto the bale support, a valve-controlled fluid pressure system connected to the power cylinder, the valve being mounted adjacent the platform, a depressible trigger normally extending above the platform, and linkage connected between the trigger and valve, said linkage upon depression of the trigger by a bale delivered to the platform being operative to place the valve in a position whereby the power cylinder operates to advance the pusher to move the bale from the platform onto the bale support, and means to reset the trigger to its position extending above the platform; such means, acting in response to movement of the bale from the platform onto the bale support, also being operative to place the valve in another position whereby the power cylinder operates to retract the pusher; and said means including a turnable cross shaft having radial arm connection with said linkage, the cross shaft occupying one position when the trigger is in its normal position extending above the platform and another position when the trigger is depressed, and a latch unit associated with the cross shaft and operative to yieldably hold the same in either of said positions.

References Cited

UNITED STATES PATENTS

| | | |
|---|---|---|
| 3,163,302 | 12/1964 | Pridgeon. |
| 3,197,043 | 7/1965 | Unger. |
| 3,272,352 | 9/1966 | Adams et al. |
| 3,373,882 | 3/1968 | Forest. |
| 3,385,456 | 5/1968 | Snider. |
| 3,400,839 | 9/1968 | Jay et al. |
| 3,402,832 | 9/1968 | Wehde. |

GERALD M. FORLENZA, Primary Examiner

R. J. SPAR, Assistant Examiner

U.S. Cl. X.R.

214—519